United States Patent [19]

Rausch et al.

[11] 4,251,347
[45] Feb. 17, 1981

[54] WHITE MINERAL OIL MADE BY TWO STAGE HYDROGENATION

[75] Inventors: Maurice K. Rausch, Homewood, Ill.; Henry Erickson, deceased, late of Park Forest, Ill.; by Doris Erickson, executor, Richton Park, Ill.; Gerald E. Tollefsen, Calumet City; Thomas W. Kelly, Chicago, both of Ill.

[73] Assignee: Atlantic Richfield Company, Philadelphia, Pa.

[21] Appl. No.: 66,610

[22] Filed: Aug. 15, 1979

Related U.S. Application Data

[63] Continuation of Ser. No. 620,610, Oct. 8, 1975, abandoned, which is a continuation-in-part of Ser. No. 459,994, Apr. 11, 1974, abandoned.

[51] Int. Cl.$^3$ ............................................. C10G 65/02
[52] U.S. Cl. ........................................ 208/57; 208/14; 208/264
[58] Field of Search ................. 208/57, 143, 210, 264

[56] References Cited

U.S. PATENT DOCUMENTS

| 3,144,404 | 8/1964 | Tyson | 208/143 |
| 3,340,181 | 9/1967 | Diringer et al. | 208/210 |
| 3,410,787 | 11/1968 | Kubicek | 208/57 |
| 3,459,656 | 8/1969 | Rausch | 208/57 |

Primary Examiner—Herbert Levine
Attorney, Agent, or Firm—Frank J. Uxa

[57] ABSTRACT

A process for preparing white mineral oil from a mineral oil distillate of lubricating viscosity by first contacting the distillate with hydrogen in the presence of sulfur-resistant catalyst to form hydrogenated oil and then second contacting at least a portion of the hydrogenated oil with hydrogen in the presence of a second catalyst to form a refined oil from which white oil is recovered. The second catalyst, which comprises a support, at least one palladium component and at least one halogen component, possess improved catalyst activity.

15 Claims, No Drawings

WHITE MINERAL OIL MADE BY TWO STAGE HYDROGENATION

This is a continuation of application Ser. No. 620,610 filed Oct. 8, 1975 which is a continuation-in-part of application Ser. No. 459,994, filed Apr. 11, 1974, both now abandoned.

This invention relates to a process for the production of white mineral oil. More particularly, this invention relates to a two-step catalytic hydrogenation process for producing white mineral oil of high quality and in high yields.

Various prior art processes have been satisfactory in producing white mineral oils. For example. U.S. Pat. No. 3,459,656, issued Aug. 5, 1969, describes a two-step catalytic process wherein the second step takes place in the presence of a platinum group metal promoted catalyst. The present invention is directed to an improvement in such a process.

Therefore, an object of the present invention is to provide an improved two step catalytic process for the production of white mineral ois. Other objects and advantages of the present invention will become apparent hereinafter.

An improved process has now been discovered for preparing a white mineral oil from a mineral oil distillate of lubricating viscosity which comprises contacting this hydrocarbon with hydrogen in the presence of a sulfur-resistant catalyst to form a hydrogenated oil having a sulfur content reduced from the sulfur content of the distillate and then second contacting at least a portion of the hydrogenated oil with hydrogen in the presence of a second catalyst to form a refined oil having a specific dispersion reduced from the specific dispersion of the hydrogenated oil from which white mineral oil is recovered. It has been found that significantly improved results, e.g., improved catalytic hydrogenation selectivity and activity, are obtained using a second catalyst which comprises a major amount of a support, a minor, catalytically effective amount of a palladium component and a minor amount of at least one halogen component sufficient to improve the hydrogenation activity of the second catalyst.

The process of this invention has been found to be particularly effective in providing technical and food grade white mineral oils of high quality and in high yields, e.g., greater than about 90%. Suitable mineral oil distillates of lubricating viscosity for use in the present invention include heavy or light raw distillate oils, for instance obtained by distillation of a naphthenic base light reduced crude such as Gulf Coast and California crudes. The naphthenic oils often have a specific dispersion of at least about 130. Waxy lubricating oil distillates from crude oils having a characterization factor of at least 11.5, e.g., mixed base and paraffinic crude oils, may also be used in the present invention, for example, as food grade white oil feedstocks. Typically, the mineral oil distillates used in the present invention often have viscosities in the range of about 50 SUS to about 7500 SUS at 100° F. If the oils contain wax, they are preferably dewaxed prior to the first contacting step, although the dewaxing can follow this step. Dewaxing can be carried out, for example, by using a solvent, such as methylethyl ketone and toluene, to obtain an oil with a pour point (ASTM D 97) below about 25° F. The pour point necessary after dewaxing is determined by that required in the finished oil.

The first contacting step of the present process is preferably conducted at a temperature within the range from about 600° F. to about 800° F., more preferably from about 650° F. to about 725° F.; at a pressure within the range from about 1500 psig. to about 5000 psig., more preferably from about 2000 psig. to about 3000 psig.; at a weight hourly space velocity (WHSV) of about 0.1 to about 1.0, more preferably from about 0.25 to about 1.0; and at a hydrogen to mineral oil distillate ratio within the range from about 1000 s.c.f./b. to about 5000 s.c.f./b., more preferably from about 1500 s.c.f./b. to about 5000 s.c.f./b.

At least a portion of the hydrogenated oil from this first contacting step is subjected to a second contacting. This second contacting preferably occurs at a temperature of at least about 450° F., more preferably from about 450° F. to about 650° F., and still more preferably from about 450° F. to about 600° F. Thus, this second contacting is preferably initiated, e.g., at or near the inlet of the reaction zone containing the second catalyst, at a temperature of at least about 450° F., more preferably from about 450° F. to about 650° F., and still more preferably from about 450° F. to about 600° F. The present second contacting step preferably occurs at a pressure in the range from about 1500 psig. to about 5000 psig., more preferably from about 2000 psig. to about 3000 psig.; at a WHSV from about 0.1 to about 1.0, more preferably from about 0.25 to about 1.0; and at a hydrogen to hydrogenated oil ratio within the range from about 500 s.c.f./b. to about 5000 s.c.f./b., more preferably from about 1500 s.c.f./b. to about 5000 s.c.f./b.

The first catalyst of the first contacting step can by any of the sulfur resistant, non-precious metal hydrogenation catalysts some of which are conventionally employed in the hydrogenation of heavy petroleum oils. These catalysts typically comprise a major amount of a support and at least one nonprecious metallic component in an amount effective to promote the hydrogenation of the mineral oil distillate. Examples of suitable metalic components include tin, vanadium, chromium, molybdenum, tungsten, iron, cobalt, nickel and mixtures thereof. The catalyst metals can be present in the final catalyst as the free metals or in combined form, such as the oxides and sulfides. Preferably, the first catalyst contains catalytically effective amounts of at least one Group VIB metal, i.e., chromium, molybdenum and tungsten, and at least one Group VIII iron-group metal, i.e., iron, cobalt and nickel. Especially preferred catalysts contain nickel, cobalt and mixtures thereof together with tungsten, molybdenum and mixtures thereof. The Group VIB metal is preferably present in amounts of from about 5% to about 40%, more preferably from about 10% to about 30%, by weight of the total catalyst, calculated as the weight of the Group VIB metal oxide. The Group VIII iron-group metals are preferably present in an amount of from about 2% to about 15%, more preferably from about 4% to about 10%, by weight of the total catalyst, calculated as the weight of the free metal. Other metals and/or metal compounds in addition to the metal components described above, such as rhenium, germanium and the like, may be included in the first catalyst to improve the properties of the composition.

As aforementioned, the second catalyst of the present invention comprises a major amount of a support; a catalytically effective amount of a palladium component and a minor amount of at least one halogen component present in an amount sufficient to improve the hydrogenation activity of the catalyst. This second catalyst is to be distinguished from the first catalyst in that it is not normally considered to be sulfur-resistant.

The palladium component of this second catalyst may be present as the elemental metal or as a sulfide, oxide or other combined forms. Preferably, the palladium component comprises from about 0.01% to about 5.0%, more preferably from about 0.1% to about 3.0%, by weight of the second catalyst, calculated as elemental palladium.

Although various solid refractory type carriers known in the art may be utilized as a support for the first and second catalysts, the preferred support comprises a major amount of calcined, or otherwise activated, alumina. It is preferred that the alumina have a surface area of from about 25 $m^2$./gm. to about 600 $m^2$./gm. or more. The support comprises a major proportion of each catalyst, preferably at least about 60%, by weight, of the first catalyst, and preferably at least about 80%, more preferably at least about 90%, by weight of the second catalyst. The alumina may be derived from hydrous alumina predominating in alumina trihydrate, alumina monohydrate, amorphous hydrous alumina and mixtures thereof, which alumina when formed as pellets and calcined, has an apparent bulk density of from about 0.60 gm./cc. to about 0.85 gm./cc., pore volume from about 0.45 ml./gm. to about 0.70 ml./gm., and surface area from about 50 $m^2$./gm. to about 500 $m^2$./gm. The alumina supports may contain, in addition, minor proportions of other well-known refractory inorganic oxides such as silica, zirconia, magnesia and the like. However, the preferred supports are substantially pure alumina derived from hydrous alumina predominating in alumina monohydrate, amorphous hydrous alumina and mixtures thereof. More preferably, the alumina is derived from hydrous alumina predominating in alumina monohydrate.

The alumina supports may be synthetically prepared in any suitable manner and may be activated prior to use by one or more treatments including drying, calcination, steaming and the like. For example, calcination often occurs by contacting the support at a temperature in the range from about 700° F. to about 1500° F., preferably from about 850° F. to about 1300° F., for a period of time from about one hour to about 20 hours, preferably from about one hour to about 5 hours. Thus, for instance, hydrated alumina in the form of a hydrogel can be precipitated from an aqueous solution of a soluble aluminum salt such as aluminum chloride. Ammonium hydroxide is a useful agent for effecting the precipitation. Control of the pH to maintain it within the values of about 7 to about 10 during the precipitation is desirable for obtaining a good rate of conversion. Extraneous ions, such as halide ions, which are introduced in preparing the hydrogel, can, if desired, be removed by filtering the alumina hydrogel from its mother liquor and washing the filter cake with water. Also, if desired, the hydrogel can be aged, say for a period of several days to build up the concentration of alumina trihydrate in the hydrogel.

The alumina may be formed into macrosize particles of any desired shape such as pills, cakes, extrudates, powders, granules, spheres, and the like using conventional methods. The size selected for the macrosize particles can be dependent upon the intended environment in which the final catalyst is to be used—as, for example, whether in a fixed or moving bed reaction system. Thus, for example, where as in the preferred embodiment of the present invention, the catalysts are designed for use in reaction systems employing a fixed bed of catalyst, the alumina will preferably be formed into particles having a minimum dimension of at least about 0.01 inch. and a maximum dimension up to about one-half inch. or one inch. or more. Spherical particles having a diameter of about 0.03 inch. to about 0.25 inch., preferably about 0.03 inch. to about 0.15 inch., are often useful, especially in a fixed bed reactor system.

An essential constituent of the second catalyst of the present invention is a halogen component. Although the precise chemistry of the association of the halogen component with the support, e.g., alumina, is not entirely known, the halogen component may be referred to as being combined with the alumina support or with the other ingredients of the catalyst. This combined halogen may be fluorine, chlorine, bromine, and mixtures thereof. Of these, fluorine and, particularly, chlorine are preferred for the purposes of the present invention. The halogen may be added to the alumina support in any suitable manner, either during preparation of the support, or before or after the addition of the palladium. For example, at least a portion of the halogen may be added at any stage of the preparation of the support, or to the calcined catalyst support, as an aqueous solution of an acid such as hydrogen fluoride, hydrogen chloride, hydrogen bromide and the ike, or as a substantially anhydrous gaseous stream of these halogencontaining components. The halogen component, or a portion thereof, may be composited with alumina during the impregnation of the latter with the palladium component, for example, through the utilization of a mixture of chloropalladic acid and hydrogen chloride. When the catalyst is prepared by impregnating calcined, formed alumina, for example, spheres, it is preferred to impregnate the support simultaneously with the palladium and halogen. In any event, the halogen will be added in such a manner as to result in a fully composited second catalyst that contains from about 0.1% to about 4.0% and preferably from about 0.6% to about 2.5% by weight of halogen calculated on an elemental basis. During processing, i.e., the period during which hydrogenated oil in the presence of hydrogen is being contacted with the second catalyst, the halogen content of the second catalyst can be maintained at or restored to the desired level by the addition of halogen-containing compounds, such as carbon tetrachloride, ethyl trichloride, t-butyl chloride and the like, to the hydrogenated oil before such second contacting.

As indicated above, the second catalyst of the present invention contains at least one palladium component.

The palladium component may be incorporated in the catalyst in any suitable manner, such as by coprecipitation or cogellation with the alumina support, ion-exchange with the alumina support and/or alumina hydrogel, or by the impregnation of the alumina support calcination of the alumina hydrogel. One preferred method for adding the palladium component to the alumina support involves the utilization of a water soluble compound of palladium to impregnate the alumina support after calcination. For example, palladium may be added to the support by comingling the calcined alumina with an aqueous solution of chloropalladic acid. Other water-soluble compounds of palladium may be employed as impregnation solutions, including, for example, ammonium chloropalladate and palladium chloride. The utilization of a palladium-chlorine compound, such as chloropalladic acid, is preferred since it facilitates the incorporation of both the palladium component and at least a minor quantity of the halogen component. Following this impregnation, the resulting impregnated support is dried and may be subjected to a high temperature calcination or oxidation procedure at a temperature in the range from about 700° F. to about 1500° F., preferably from about 850° F. to about 1300° F., for a period of time from about one hour to about 20 hours, preferably from about one hour to about five hours. The major portion of the halogen component may be added to this otherwise fully composited second catalyst by contacting this catalyst with a substantially anhydrous stream of halogen-containing gas.

If desired, the catalyst of the first and second contactings can be hydrogen purged and/or prereduced prior to use by heating in the presence of hydrogen, for example, at temperature of about 300° F. to 600° F. for purging and of about 600° F. to 1200° F. for prereducing. By prereduction is meant the chemical reaction, i.e., reduction in oxidation state, of at least a portion of the metallic component of the catalyst. Prereduction may be achieved by contacting the catalyst with hydrogen for a period of time of at least about one-half ($\frac{1}{2}$) hour, preferably from about 0.5 hour to about 10 hours and at a pressure of from about 0 psig. to about 500 psig.

Following either the first or second contacting step of the present invention the hydrogenated oil and refined oil may be distilled or topped if desired to remove any hydrocracked or other light products to increase the flash point of the oil. The degree of topping desired will depend on the particular lubricating oil fraction being processed and the particular contacting conditions employed. Thus, the amount of topped overhead that may be taken off in the topping or distillation step after either contacting may often vary from about 0 to about 50%, with about 0 to about 10% being preferred.

EXAMPLE I

This example illustrates certain of the advantages of the present invention.

A raw heavy lube distillate feedstock was chosen to be treated according to the present invention. This feedstock had the following properties:

Gravity, °API: 17.7
Viscosity, SUS at 100° F.: 900
Four Point, °F.: −15
Specific Dispersion: 148
Sulfur content, Wt.%: 0.25
Nitrogen Content, ppm.: 320
Boiling Range, °F.: 700–900

This feedstock was first contacted in a fixed bed reaction system with hydrogen in the presence of a commercially available sulfur-resistant non-precious metal catalyst. This catalyst had the following composition and properties:

Support: Alumina
Nickel Content, Wt.%: 2.3
Molybdenum Content, Wt.%: 15.6 (calculated as $MoO_3$)
Phosphorus Content, Wt.%: 1.4
Surface area, $m^2$./gm.: 162
Total Pore Volume, cc./gm.: 0.53

This first contacting took place at the following conditions:
Temperature, °F.: 650
Pressure, psig.: 2500
WHSV: 0.25
Hydrogen to Distillate Feedstock, s.c.f./b.: 2500

The hydrogenated oil produced by this first contacting was fractionated (or topped) to remove a small amount of light material which had been formed. The portion of this hydrogenated oil boiling from 650° F. to 900° F. (the bottoms cut) had the following properties:

Gravity, °API: 22.8
Viscosity, SUS at 100° F.: 536
Pour Point, °F.: −15
Specific Dispersion: 106.8
Sulfur Content, Wt.%: 0.006%
Nitrogen Content, ppm.: 5

A second catalyst was prepared as follows. An extrudate of dry, calcined gamma alumina was formed from boehmite precursor using conventional techniques. This extrudate had a surface area of 194 $m^2$./gm. and a total pore volume of 0.60 cc./gm.

399 gms. of the extrudate was vacuum impregnated at 170° F. with 450 ml. of an aqueous solution containing 17.39 gms. of palladium chloride, 10 ml. of 3 molar hydrochloric acid and 21 ml. of 3 molar nitric acid. The mixture of extrudate and solution was allowed to equilibrate. The impregnated extrudate was vacuum dried for two and one-half hours and then transferred to an oven for additional drying at 230° F. This dried extrudate was calcined by treating this material in a dry blowing air atmosphere at 900° F. for three hours. The product of this calcination, i.e., the final unreduced second catalyst, included 2.0% by weight of palladium, calculated as elemental palladium, and 1.71% by weight of chloride, calculated as elemental chlorine.

200 gms. of this unreduced second catayst was placed in a fixed bed reaction system. At least a portion of the palladium component was chemically reduced by contacting the unreduced second catalyst with hydrogen, at the rate of 2 s.c.f./hr. at atmospheric pressure and 600° F. for a period of two hours.

The inlet temperature of the reaction zone containing this second catalyst was maintained above about 450° F. The hydrogenated oil and hydrogen was contacted with this second catalyst at the following conditions:

Average Temperature, °F.: 500
Pressure, psig.: 2500
WHSV: 0.25
Hydrogen to Hydrogenated Oil s.c.f./b.: 2500

The reaction temperature was maintained above about 450° F. substantially throughout the hydrogenated oil-hydrogen-second catalyst contacting. This resulting refined oil was subjected to a stripping operation to remove light hydrocarbons formed in this second contacting step. The remaining refined oil had the following properties:

Gravity, °API: 23.9
Viscosity, SUS at 100° F.: 503
Boiling Range, °F.: 640°–900° F.
Specific Dispersion: 98.9
Saybolt Color: 30+

The yield of this portion of the defined oil, i.e., technical grade white oil, is about 90% by volume, based on the volume of the raw lube distillate feedstock. This technical grade white oil easily meets or exceeds the ultra-violet absorbance specifications for technical grade white mineral oil.

While this invention had been described with respect to various specific examples and embodiments, it is to be understood that the invention it not limited thereto and that is can be variously practiced within the scope of the following claims.

The embodiments of the invention in which an exclusive property or privilege is claimed are defined as follows:

1. In a process for preparing a white mineral oil from a mineral oil distillate of lubricating viscosity by first contacting said distillate with hydrogen in the presence of a sulfur-resistant catalyst to form a hydrogenated oil and then second contacting at least a portion of said hydrogenated oil with hydrogen in the presence of a second catalyst to form a refined oil from which white oil is recovered, the improvement comprising second contacting said hydrogenated oil in the presence of a second catalyst which comprises a major amount of alumina, a minor catalytically-effective amount of at least one palladium component and a minor amount of at least one halogen component sufficient to improve the activity of said second catalyst, provided that the temperature at which said second contacting occurs is above 450° F. throughout said second contacting.

2. The process of claim 1 wherein the palladium component comprises from about 0.1% to about 5.0% by weight of said second catalyst and said halogen component comprises from about 0.1% to about 4.0% of said second catalyst.

3. The process of claim 2 wherein said second contacting is initiated at a temperature within the range from about 450° F. to about 650° F., said second contacting takes place at a pressure within the range from about 1500 psig. to about 5000 psig., at a WHSV within the range of from about 0.1 to about 1.0, and at a hydrogen to hydrogenated oil ratio within the range of from about 500 s.c.f./b. to about 5000 s.c.f./b.

4. The process of claim 3 wherein said palladium component comprises from about 0.1% to about 3.0% by weight of said second catalyst and said halogen component comprises from about 0.6% to about 2.5% by weight of said second catalyst.

5. The process of claim 4 wherein said second contacting takes place at a temperature in the range from about 450° F. to about 650° F.

6. The process of claim 5 wherein said second contacting is initiated at a temperature within the range from about 450° F. to about 600° F., said second contacting takes place at a pressure within the range from about 2000 psig. to about 3000 psig., at a weight hourly space velocity within the range from about 0.25 to about 1.0 and at a hydrogen to hydrogenated oil ratio within the range from about 1500 s.c.f./b. to about 5000 s.c.f./b.

7. The process of claim 6 wherein the support of said second catalyst is alumina derived from hydrous alumina predominating in alumina monohydrate and said second contacting takes place at a temperature within the range from about 450° F. to about 600° F.

8. The process of preparing a white mineral oil comprising first contacting a mineral oil distillate of lubricating viscosity with hydrogen in the presence of a sulfur-resistant hydrogenation catalyst to form a hydrogenated oil, said first contacting taking place at a temperature within the range from about 600° F. to about 800° F., at a pressure within the range from about 1500 psig. to about 5000 psig., at a weight hourly space velocity in the range from about 0.1 to about 1.0, and at a hydrogen to distillate ratio within the range from about 1000 s.c.f./b. to about 5000 s.c.f./b.; and second contacting at least a portion of said hydrogenated oil with hydrogen in the presence of a catalyst comprising a major amount of a support, a minor, catalytically-effective amount of at least one palladium component, and a minor amount sufficient to improve the activity of said catalyst of at least one halogen component to form a refined oil, the temperature at which said second contacting occurs being above 450° F. throughout said second contacting, said second contacting taking place at a pressure within the range from about 1500 psig. to about 5000 psig, at a weight hourly space velocity within the range from about 0.1 to about 1.0, and at a hydrogen to hydrogenated oil ratio within the range from about 500 s.c.f./b. to about 5000 s.c.f./b.; and treating at least a portion of said refined oil to recover said white mineral oil.

9. The process of claim 8 wherein said palladium component comprises from about 0.01% to about 5.0% by weight of said second catalyst and said halogen component comprises from about 0.1% to about 4.0% by weight of said second catalyst, and said second contacting is initiated at a temperature within the range from about 450° F. to about 650° F.

10. The process of claim 9 wherein said second contacting takes place at a temperature within the range from about 450° F. to about 650° F., at a pressure within the range from about 2000 psig. to about 3000 psig., at a weight hourly space velocity within the range from about 0.25 to about 1.0, and at a hydrogen to hydrogenated oil ratio within the range from about 1500 s.c.f./b. to about 5000 s.c.f./b.

11. The process of claim 10 wherein said palladium component comprises from about 0.1% to about 3.0% by weight of the second catalyst and said halogen component comprises from about 0.6% to about 2.5% by weight of the second catalyst.

12. The process of claim 11 wherein said halogen component is chlorine.

13. The process of claim 12 wherein the supports of both first and second catalyst comprise alumina and said second contacting is initiated at a temperature within the range from about 450° F. to about 600° F.

14. The process of claim 13 wherein said first contacting takes place at a temperature within the range from about 650° F. to about 725° F., at a pressure within the range from about 2000 psig. to about 3000 psig., at a weight hourly space velocity from about 0.25 to about 1.0 and at a hydrogen to distillate ratio within the range from about 1500 s.c.f./b. to about 5000 s.c.f./b.

15. The process of claim 14 wherein the support of both first and second catalysts is alumina derived from hydrous alumina predominating in alumina monohydrate and said second contacting takes place at a temperature within the range from about 450° F. to about 600° F.

* * * * *